US009604294B2

(12) United States Patent
Strohmeier et al.

(10) Patent No.: US 9,604,294 B2
(45) Date of Patent: Mar. 28, 2017

(54) SHEARING BLADE HAVING A BLADE INSERT

(75) Inventors: Kurt Strohmeier, Aschach an der Steyr (AT); Peter Herwig, Schmalkalden (DE)

(73) Assignee: Weber-Hydraulik GmbH, Losenstein (AT)

( * ) Notice: Subject to any disclaimer, the term of this patent is extended or adjusted under 35 U.S.C. 154(b) by 262 days.

(21) Appl. No.: 14/122,363

(22) PCT Filed: May 29, 2012

(86) PCT No.: PCT/AT2012/050075
§ 371 (c)(1),
(2), (4) Date: Jan. 16, 2014

(87) PCT Pub. No.: WO2012/162714
PCT Pub. Date: Dec. 6, 2012

(65) Prior Publication Data
US 2014/0123824 A1     May 8, 2014

(30) Foreign Application Priority Data

May 27, 2011   (AT) ...................................... 782/2011

(51) Int. Cl.
*B23D 31/00*   (2006.01)
*B23D 35/00*   (2006.01)

(52) U.S. Cl.
CPC .......... *B23D 35/008* (2013.01); *B23D 31/00* (2013.01); *B23D 35/00* (2013.01); *B23D 35/002* (2013.01);
(Continued)

(58) Field of Classification Search
CPC .. B23D 35/001; B23D 35/002; B23D 35/008; B23D 35/00; B23D 31/008; Y10T 83/9447
(Continued)

(56) References Cited

U.S. PATENT DOCUMENTS 1,956,587 A    5/1932   Parker et al.
4,043,367 A *  8/1977   Knuth .................. B23D 61/122
                                                  30/501
(Continued)

FOREIGN PATENT DOCUMENTS

CN    2306090 Y    2/1999
CN    2707411 Y    7/2005
(Continued)

OTHER PUBLICATIONS

International Search Report of PCT/AT2012/050075, mailed Oct. 25, 2012.

*Primary Examiner* — Kenneth E. Peterson
*Assistant Examiner* — Nhat Chieu Do
(74) *Attorney, Agent, or Firm* — Collard & Roe, P.C.

(57) ABSTRACT

A shearing blade for a cutting device includes a main body that has a seat and a blade insert that is arranged on the seat and forms a cutting wedge, wherein the cutting wedge forms a cutting edge via a flank face and a pressure face at an angle to the flank face. The seat has at least one undercut face that acts in a direction transverse to the flank face. When the blade insert is inserted, the undercut face interacts with at least one form-closure face formed on the blade insert, whereby a form closure taking effect transversely to the flank face is established. The blade insert is fastened to the main body by at least one pin-shaped plug-in connection
(Continued)

element, which is oriented perpendicular to the flank face and which is arranged in aligned holes in the main body and in the blade insert.

10 Claims, 4 Drawing Sheets

(52) U.S. Cl.
CPC .......... *B23D 31/008* (2013.01); *B23D 35/001* (2013.01); *Y10T 83/9447* (2015.04)

(58) Field of Classification Search
USPC .... 30/254, 260, 134, 228; 83/840–845, 913; 407/42–50
See application file for complete search history.

(56) References Cited

U.S. PATENT DOCUMENTS

| 4,193,189 | A | * | 3/1980 | Marin | ..................... B26B 13/20 30/260 |
|---|---|---|---|---|---|
| 5,873,168 | A | | 2/1999 | Johnson et al. | |
| 5,950,945 | A | * | 9/1999 | Schaller | .................. B02C 13/28 241/189.1 |
| 6,202,308 | B1 | * | 3/2001 | Ramun | .................. B23D 17/00 241/101.72 |
| 2007/0130776 | A1 | * | 6/2007 | Grant | ................... B23D 31/008 30/134 |

FOREIGN PATENT DOCUMENTS

| DE | 6 24 096 C | 1/1936 | | |
|---|---|---|---|---|
| DE | 9 207 522 U1 | 8/1992 | | |
| DE | 20 2004 011 263 U1 | 8/2005 | | |
| DE | 102009059940 | * | 6/2011 | .......... B23D 35/001 |
| GB | 11 477 A | 5/1915 | | |
| GB | 1 597 745 A | 9/1981 | | |
| GB | 2 254 580 A | 10/1992 | | |
| JP | 2003 001518 A | 1/2003 | | |
| RU | 2528 U1 | 8/1996 | | |
| SU | 336103 A1 | 4/1972 | | |
| SU | 529019 A1 | 9/1976 | | |
| WO | 2007 030077 A1 | 3/2007 | | |

* cited by examiner

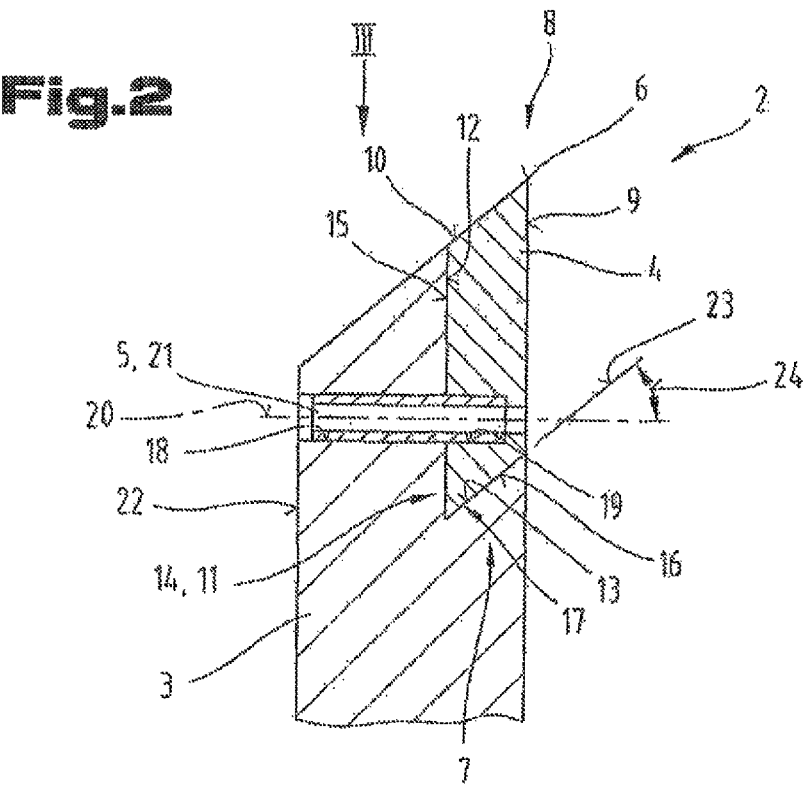
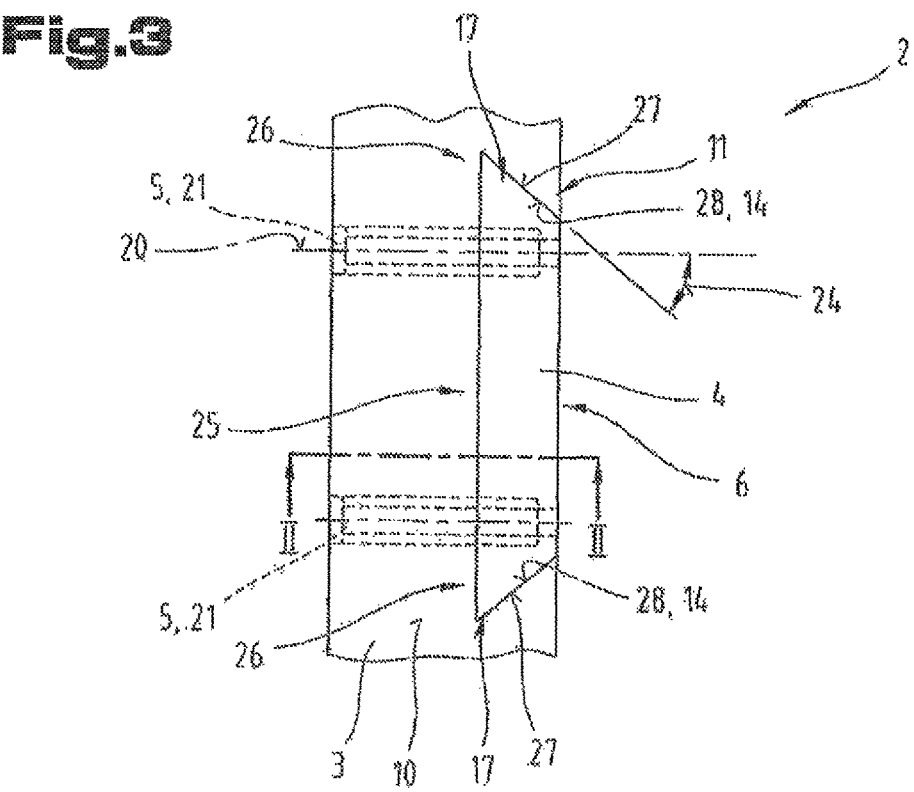

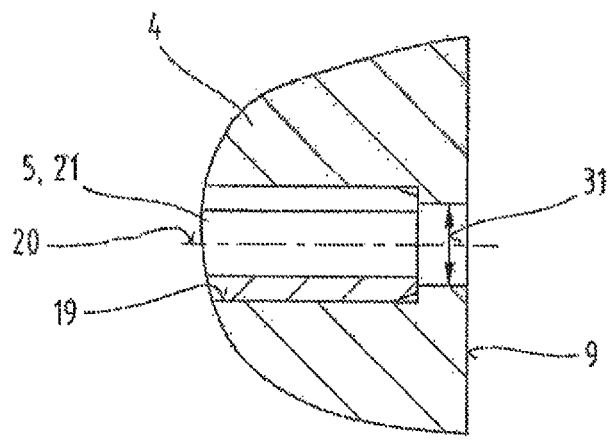
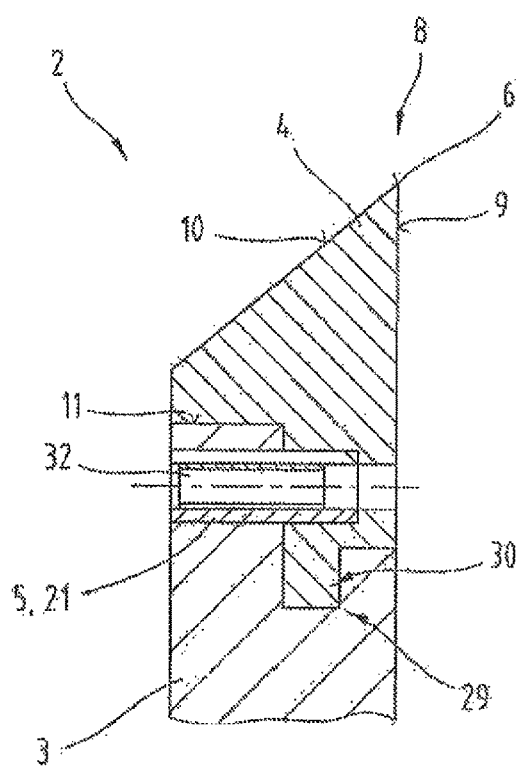
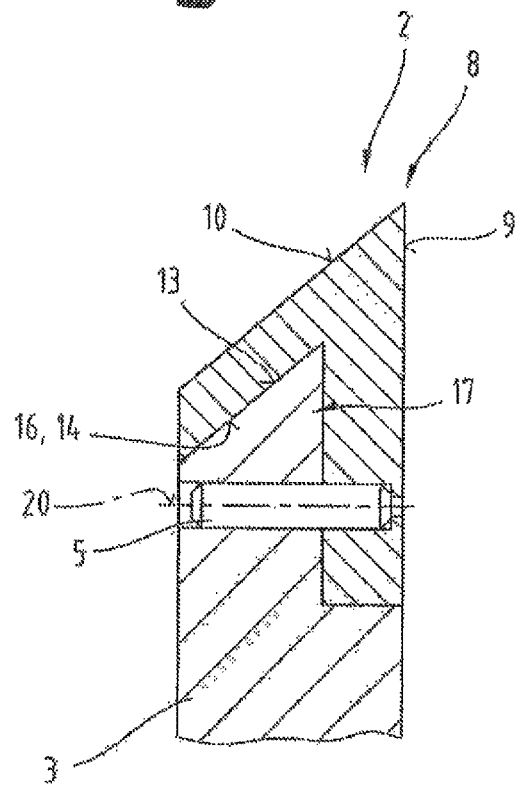

SHEARING BLADE HAVING A BLADE INSERT

CROSS REFERENCE TO RELATED APPLICATIONS

This application is the National Stage of PCT/AT2012/050075 filed on May 29, 2012, which claims priority under 35 U.S.C. §119 of Austrian Application No. A 782/2011 filed on May 27, 2011, the disclosure of which is incorporated by reference. The international application under PCT article 21(2) was not published in English.

The invention relates to a shearing blade.

In a known embodiment of cutting devices the shearing blade is designed so that it comprises a shearing blade main body and a blade insert arranged on or inserted into the latter. For cutting devices used for rescue or demolition purposes, the shearing blades are exposed to particularly rough conditions of use. Therefore, the main bodies of the shearing blades are preferably made from a tough material, whereas the blade inserts are preferably made from a hard material with a good cutting effect and low wear. In such an embodiment if the cutting edge gets damaged it is not necessary to replace the entire shearing blade but it is sufficient to replace the damaged blade insert. Simply replacing the blade insert is less expensive than replacing the whole shearing blade, which is why such shearing blades are an economically advantageous design.

A recovery device with a shearing blade consisting of a shearing blade main body and a blade insert inserted therein is known for example from DE 20 2004 011 263 U1 or GB 2 254 580 A. The blade inserts are fixed to the main body in said shearing blades by means of five or three securing screws. This method of fixing the blade inserts is relatively expensive however as it is necessary to provide internal threads either in the main body or in the blade insert and furthermore the replacement of such blade inserts is awkward and time-consuming, particularly if the necessary tools cannot be used easily because of dirt or mechanical damage when in use.

The objective of the invention is to improve the securing of a blade insert into a shearing blade main body so as to facilitate both the production of the individual components and the replacement of blade elements.

The objective is achieved by means of a generic shearing blade with the features in accordance with the invention.

As the seat has an undercut face acting in a direction perpendicular to the flank face, which undercut face when the blade is inserted interacts with a form-closure face formed thereon, and in this way a form-closure is produced acting perpendicular to the flank face and as the blade insert is secured to the main body by means of a pin-like plug-in connection element oriented perpendicularly to the flank face and arranged in aligned holes in the main body and the blade insert, a stable fit of the blade insert is achieved on the main body, which can be secured without using screw connections and is structurally simple.

The at least one undercut face on the main body and/or the at least one form-closure face on the blade insert can thereby extend over the entire edge of the blade insert or seat in the main body or can also be configured only in sections. The plug-in connection element can be formed by an easily obtainable and inexpensive standard component and also the holes for receiving the plug-in connection element can be produced on the main body and on the blade insert at little cost. As forces are transferred transversely to the flank face mainly between the form-closure face and undercut face, it is not a disadvantage that a plug-in connection element can transfer only small tensile forces, and to reliably secure the blade insert into the shearing blade it is sufficient to have only a small number of such plug-in connection elements. Preferably, the blade insert is fixed to the main body by only two plug-in connection elements. To insert a plug-in connection element preferably the hole on the main body extends from the seat to the outside of the main body and the plug-in connection element is introduced through the main body into the latter and into the blade insert.

If the end sections or the end faces of the blade insert have form-closure faces which interact with undercut faces on the main body, a blade insert can also, alternatively or in addition to the rear side, be secured at its ends from being pulled out of the seat on the main body perpendicular to the flank face. The forces to be transferred by the plug-in connection elements are reduced accordingly.

In particular, the undercut faces for the end sections of the blade insert can have the same profile in cross section as the undercut faces for the middle part of the blade insert. In this way the undercut of the seat on the main body both for the middle part of the blade insert and for its end sections can be produced by a single tool in a setting.

In an advantageous embodiment the undercut face is formed by a half dovetail groove in the main body and the inserted blade insert has a parallelogram-like cross section and the form-closure face together with a bearing face roughly parallel to the flank face forms an acute-angled form-closure wedge opposite the cutting edge, which wedge engages in the dovetail groove and in this case engages behind the undercut face. A form-closure connection between the blade insert and main body by means of a dovetail-like connection is simple to produce by manufacturing and the form-closure wedge has a stable fit in the main body and is effectively secured from being removed at right angles or transversely to the flank face. By means of the plug-in connection element, the orientation of which differs from the direction of the undercut face, the blade insert is reliably prevented from sliding out.

Advantageous conditions are created for the transmission of force between the blade insert and main body if the form-closure wedge has a wedge angle of between 45° and 80°.

An alternative embodiment of the seat is achieved if the undercut face is formed by a half T-groove in the main body and the form-closure face on the blade insert is formed by a rebated joint engaging behind the T-groove. This embodiment is also relatively easy to manufacture and the blade insert cannot be displaced with an inserted plug-in connection element transversely to the flank face relative to the main body.

If the hole for receiving the plug-in connection element in the blade insert extends up to the flank face, to change the blade insert the plug-in connection element can be pushed out in a simple manner from the flank face.

To prevent the end of the plug-in connection element escaping from the blade insert unintentionally over the flank face when in use, it is an advantage if in the region of the flank face the hole in the blade insert has a smaller, step-like reduced diameter or other kind of narrowing in the hole cross section.

According to an economic embodiment that has proved effective in practice the plug-in connection element is formed by a dowel pin in the form of a hollow, longitudinally slotted pin. A dowel pin of this kind can balance out component measurement tolerances because of its flexibility in the direction of the diameter and is a structurally simple and reliable solution for fixing the blade insert to the seat. Furthermore, the plug-in connection element can be formed by a spiral dowel pin, a grooved pin or a cylinder pin, whereby all of these embodiment variants make it possible to avoid having internal threads in the components.

A further increase in stability is achieved if the dowel pin is strengthened by an additional plug-in element inserted into its hollow interior. This can have the same or a different structure as the outer plug-in connection element.

An easily manufactured embodiment is achieved if the central axis of the plug-in connection element is oriented at right angles to the flank face. In this way the plug-in connection element is in any case at an angle to the undercut face and thus ensures the required fixing of the blade insert. At the same time the plug-in connection element can transmit any shearing forces transversely to its central axis in all directions.

An even transmission of force between the blade insert and main body is achieved if the seat on the main body for the rear side or the rear of the blade insert is formed essentially by flat surfaces. An embodiment of the seat of this kind can be produced by a straight milling movement of a corresponding milling cutter and in this way in the middle part of the blade insert even contact and a stable, flat support is ensured on the main body.

If the direction of the central axis of the plug-in connection element differs by an angle of at least 10° from the direction of the undercut face, the blade insert is secured sufficiently in the seat, as displacement is prevented parallel to the undercut face by the shearing resistance of the plug-in connection element.

For a better understanding of the invention the latter is explained in more detail with reference to the following Figures.

In a much simplified view:

FIG. 2 shows a cross section according to line II-II in FIG. 3 of a shearing blade with blade insert in a first embodiment;

FIG. 3 shows a view of the shearing blade according to FIG. 2 in direction III;

FIG. 6 shows a detailed view of the plug-in connection element in the region of the flank face of the blade insert;

FIG. 7 shows a further possible embodiment of a shearing blade with blade insert;

FIG. 8 shows a further possible embodiment of a shearing blade with blade insert.

Figure 1:
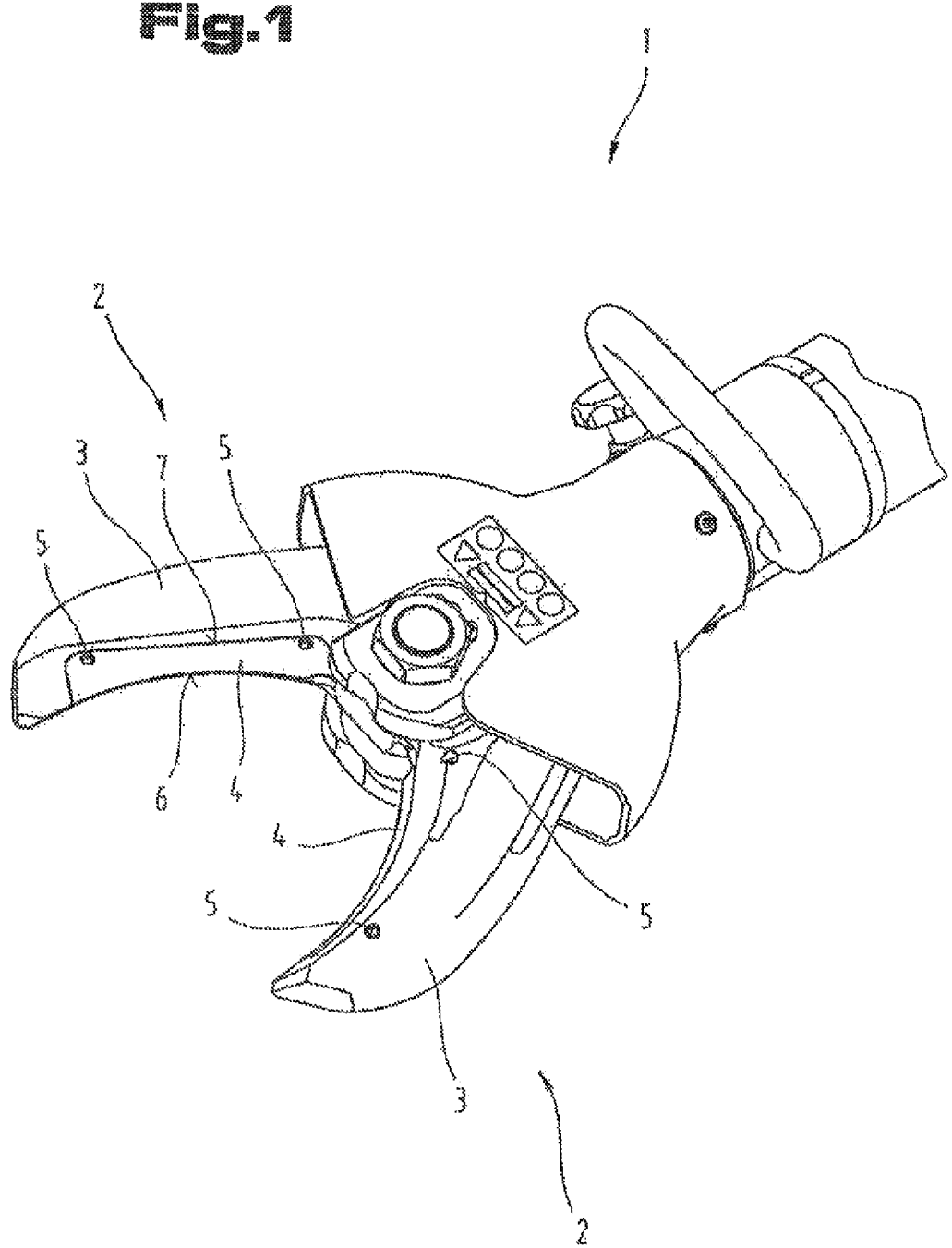
FIG. 1 shows a cutting device with two interacting shearing blades with replaceable blade inserts.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

FIG. 1 shows in an oblique view a cutting device 1, as often used for rescuing people from vehicles in accidents or for other purposes such as e.g. demolition work. The latter comprises two shearing blades 2 driven by a not shown drive, for example a hydraulic-cylinder, which are arranged articulated on a frame of the cutting device 1 and are used for cutting many different materials by shear cutting. The shearing blades 2 comprise a main body 3 with a seat on which a blade insert 4 is arranged or inserted. The seat has a special form explained with reference to other Figures with an undercut which produces a form-closure between the blade insert 4 and main body 3, and the blade inserts 4 are fixed by means of pin-like plug-in connection elements 5 to the main body 3.

In the exemplary embodiment shown the blade inserts 4 or the shearing blades 2 have curved cutting edges 6, which can be advantageous for the cutting process. The rear sides 7 of the blade inserts 4 are straight however, whereby a reliable, even bearing is achieved on the main body 3. The blade inserts 4 are preferably inserted into the main body 3 so that there are flush transitions to the main body 3.

The main body 3 of a shearing blade 2 is preferably made of tough steel which can also withstand hard, impact-like stresses. However, also a weight-saving embodiment of the main body is possible which is made of a lighter material than steel. The blade insert 4 of such a shearing blade 2 is made however from a material that is as hard as possible with good cutting properties enabling harder materials to be cut.

FIG. 2 shows in part a cross section along line II-II of FIG. 3 of a shearing blade 2, wherein a blade insert 4 is inserted into a main body 3. The shearing blade 2 shown in FIG. 3 in perspective according to arrow III of FIG. 2 can relate to the same embodiment of a shearing blade 2 as in FIG. 2, however there is also an embodiment in which no undercut is provided on the rear side 7 of the blade insert 4. FIG. 2 can also represent an embodiment in which an undercut is provided only on the rear side 7, but not on the ends of the blade insert 4.

The cutting edge 6 is formed by a cutting wedge 8, which is formed in turn by an intersection of a flank face 9 and a pressure face 10. During a cutting process the shearing blade 2 pointing upwards in FIG. 2 cooperates with a not shown second shearing blade, the flank faces 9 being moved a small distance past one another. The cutting wedges 8 thus penetrate into a not shown object to be cut through, whereby the pressure faces 10 press on the surface of the object and then the object is cut through.

The surfaces on which the blade insert 4 contacts the main body 3 form a seat 11, wherein in the exemplary embodiment shown FIG. 2 the seat 11 comprises a seat bearing face 12 roughly parallel to the flank face 9 and an undercut face 13 arranged at an acute angle to the latter. The seat 11 corresponds in FIG. 2 to a half dovetail groove 14. The blade insert 4 is approximately parallelogram-shaped in cross section and bears with a blade insert bearing face 15 approximately parallel to the flank face 9 on the seat bearing face 12 of the main body and with a form-closure face 16 on the undercut face 13 of the dovetail groove 14. The form-closure face 16 forms together with the blade insert bearing face 15 on the blade insert 4 an acute-angled form-closure wedge 17 roughly opposite the cutting edge 6, which form-closure wedge engages in the dovetail groove 14. The form-closure wedge 17 can of course have a different wedge angle than the cutting wedge 8, an angle of between 45° and 80°, for example 60° has proved to be advantageous. The cross section of the blade insert 4 does not need to be in the form of a parallelogram, as shown, but can of course also have a different contour if the seat 11 in the main body 3 is designed accordingly.

The blade insert 4 inserted into the seat 11 is also connected to the main body 3 by a plug-in connection element 5, which is arranged in the blade insert 4 in a hole 18 in the main body 3 and a hole 19 aligned therewith. In the shown exemplary embodiment the central axis 20 of the plug-in connection element 5 is oriented at right angles to the flank face 9, but can also have a different orientation to this. To achieve a secure form-closure of the blade insert 4 in the main body 3 it is important however that the central axis 20 of the plug-in connection element 5 is different by an angle of at least 20° from the direction of the undercut face 13.

The plug-in connection element 5 is fixed in the holes 18 and 19 by a press fit, for which reason the plug-in connection element 5 in the unmounted state has a slightly larger diameter than the holes 18 or 19. The plug-in connection element 5 is designed in the shown exemplary embodiment as a dowel pin 21, which has the form of a hollow, longitudinally slotted pin. By means of the longitudinal slot it has a certain degree of elasticity in radial direction which facilitates or allows pressing into the holes 18, 19, even if the central axes of the holes are not aligned exactly because of manufacturing tolerances.

The pressing in of the plug-in connection element 5 is performed preferably from the rear side 22 of the shearing blade 2, for which reason the hole 18 passes fully through the main body 3 from the rear side 22 to the seat 11 or to the seat bearing face 12. In order to enable the easy detachment of the inserted plug-in connection element 5 the hole 19 passes through the blade insert 4 fully, whereby the plug-in connection element 5 can be pushed out again easily. The central axis 20 of the plug-in connection element 5 deviates from the direction 23 of the undercut face 13 by an angle 24, which is preferably at least 10°, e.g. about 30°.

FIG. 2 shows a cross section of the blade insert 4 in the region of the middle part 25 between the plug-in connection elements 5. FIG. 3 shows that additionally or alternatively the end sections 26 of the blade insert 4 can have form-closure faces 27 which interact with undercut faces 28 on the main body 3. The end sections 26 or end faces of the blade insert 4 thus have a form closure in a direction perpendicular to the flank face 9 which is achieved in the shown exemplary embodiment and also in the example according to FIG. 2 by the interaction of a form-closure wedge 17 with a dovetail groove 14. Preferably, the undercut faces 28 for the end sections 26 in cross section have the same profile as the undercut faces 13 for the middle part 25 of the blade insert 4, whereby the seat 11 can be produced in the main body 3 in a single setting by a single milling cutter. The transition between the rear side 7 of the blade insert 4 and its end faces is rounded in this case.

Figure 4:
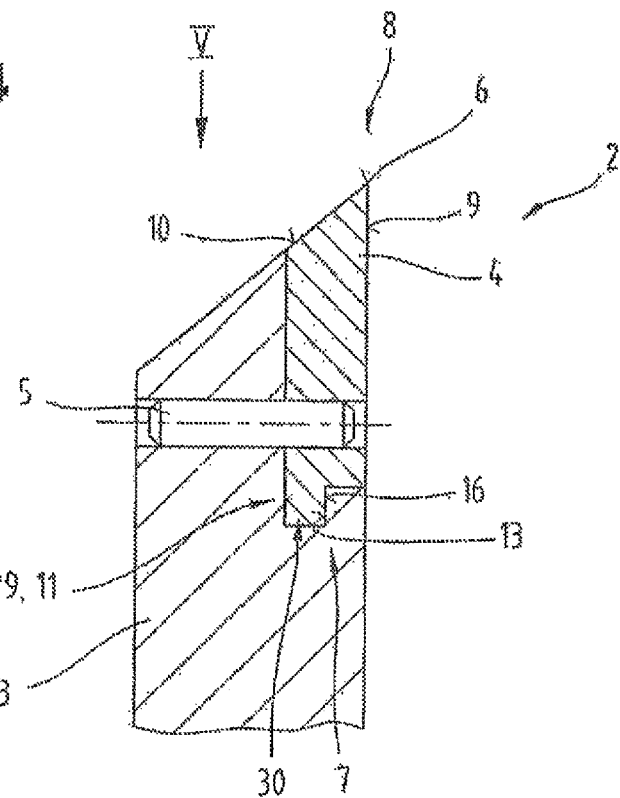
FIG. 4 shows a cross section according to line IV-IV in FIG. 5 of an additional embodiment of a shearing blade with blade insert.
Figure 5:
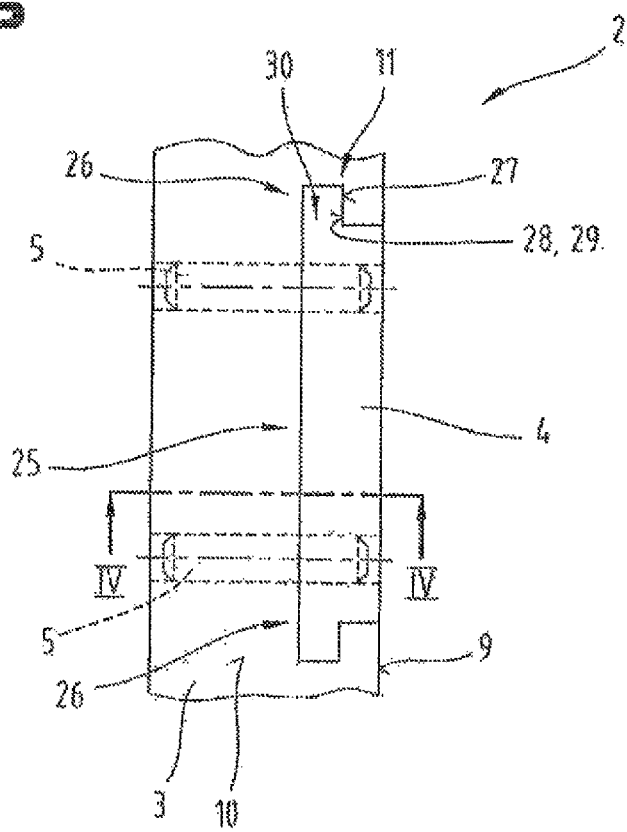
FIG. 5 shows a view of a shearing blade according to FIG. 4 in direction V.

FIGS. 4 and 5 show a further and possibly independent embodiment of the shearing blade 2, wherein the same component numbers and component names are used for the same parts as in the preceding FIGS. 1 to 3. To avoid unnecessary repetition reference is made to the detailed description of the preceding FIGS. 1 to 3.

The embodiment of the shearing blade 2 according to FIGS. 4 and 5 is similar to the embodiment shown in FIG. 2 or 3 and here too the blade insert 4 has a form-closure in the main body 3 perpendicular to the flank face 9. The seat 11 on the main body 3 for this purpose has a half T-groove 29 into which with the inserted blade insert 4 a rebated joint 30 engages. In this case the T-groove 29 forms the undercut face 13, which is undergripped by the form-closure face 16 of the rebated joint 30 in engagement. The undercut face 13 and form-closure face 16 are formed in the exemplary embodiment according to FIG. 4 parallel to the flank face 9, but can of course also be at different angles. It is an advantage if as shown in FIG. 5 a form-closure is produced in the main body 3 also on the end sections 26 of the blade insert 4 and the blade insert 4 is secured by form closure not only on its rear side 7, but also on its end faces of the end sections 26 in the main body 3. FIG. 5 shows that the form-closure faces 27 acting on the end faces of the blade insert 4 or the seat 11 with the undercut face 28 in the main body 3 can have the same cross section as the cross section shown in FIG. 4 with the form fitting face 16 or undercut face 13 in the middle part 25 of the blade insert 4, whereby milling of the seat 11 is possible in a single setting.

The form-closure of the blade insert 4 in the main body 3 perpendicular to the flank face 9 is preferably provided both on the rear side 7 and also on the end sections 26 or their end faces spaced apart in the direction of the cutting edge, however it also possible that the form-closure is only provided on the end sections 26 or only on the rear side 7 of the blade insert 4.

If such a form-closure is provided both on the rear side 7 and on the end sections, as already mentioned, it is an advantage if the thereby effective undercut faces 13, 28 on the seat 11 have the same cross-sectional profile: it is also possible however that on the rear side 7 a different cross section for the seat 11 is selected than for the end sections 26.

FIGS. 4 and 5 can thus, as with FIGS. 2 and 3, also be considered to be different embodiments, if the form-closure is limited only to the rear side 7 or only to the end sections 26.

The blade insert is fixed into the seat 11 again by a plug-in connection element 5, which is oriented perpendicular to the flank face 9. The plug-in connection element 5 can, as already mentioned above, be formed by a dowel pin 21, but as shown can also be in the form of a simple cylinder pin, a spiral dowel pin, a grooved pin or similar connecting elements without a thread.

FIG. 6 shows a detailed section of the plug-in connection element 5 inserted into the hole 19 in the blade insert 4, which plug-in connection element is formed for example by a dowel pin 21. To prevent the plug-in connection element 5 coming out of the hole 19 on the flank face 9 when in use, it is also possible in all of the aforementioned embodiments that in the region of the flank face 9 the hole 19 has a step-like reduced, smaller diameter 31 than hole 19, wherein the difference in diameter is selected so that the escape of the plug-in connection element 5 on the flank face 9 is reliably prevented, but it is possible to drive out the plug-in connection element 5 from the flank face 9 and in this way the blade insert 4 can be replaced easily. Alternatively to the shown reduction in diameter it is also possible to provide an opening in the region of the flank face 9 which is slightly offset relative to the hole 19, whereby the escape of the plug-in connection element 5 is prevented but it is still possible to push out the pin.

FIG. 7 shows a further possible embodiment of a shearing blade 2 with a form-closure of the blade insert 4 perpendicular to the flank face 9. The seat 11 extends in this exemplary embodiment over the entire thickness of the main body 3 and the blade insert 4 has the same thickness as the main body 3. The form closure is formed here by a half T-groove 29 on the main body 3 and a rebated joint 30 on the blade insert 4, and in this regard reference is made to the description of FIGS. 4 and 5. The plug-in connection element 5 in the form of a dowel pin 21 can be strengthened, as shown in FIG. 7, by an additional plug-in connection element 32 which is inserted afterwards into the already inserted dowel pin 21. In this way the fixing of the blade insert onto the main body can be improved further in that the flexibility of the dowel pin 21, which is advantageous for the assembly, is reduced afterwards by the plug-in connection element 32 inserted into its hollow interior.

FIG. 8 shows a further exemplary embodiment of a shearing blade 2, wherein the blade insert 4 forms a flush continuation of the main body 3 and the form-closure is formed by a half dovetail groove 14 on the blade insert and a form-closure wedge 17 on the main body. The securing of the fitted blade insert 4 is performed by a plug-in connection element 5, which can be designed according to all of the previously described embodiment variants. The plug-in connection element 5 or its central axis 20 in this exemplary embodiment has a greater distance from the cutting edge 6 than the form-closure face 16 or the undercut face 13, whereby with a force on the cutting wedge 8 directed to the right in FIG. 8 a good support moment is provided for the blade insert 4 and the tensile stress on the plug-in connection element 5 is reduced even further.

The exemplary embodiments show possible embodiment variants of the shearing blade 2, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field. Thus all conceivable embodiment variants, which are made possible by combining individual details of the embodiment variants shown and described, are also covered by the scope of protection.

Finally, as a point of formality, it should be noted that for a better understanding of the structure of the shearing blade the latter and its components have not been represented true to scale in part and/or have been enlarged and/or reduced in size.

The problem addressed by the independent solutions according to the invention can be taken from the description.

Mainly the individual embodiments shown in FIGS. 1; 2; 3; 4; 5; 6; 7; 8 can form the subject matter of independent solutions according to the invention. The objectives and solutions according to the invention relating thereto can be taken from the detailed descriptions of these figures.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

LIST OF REFERENCE NUMERALS

| 1 | Cutting device |
| 2 | Shearing blade |
| 3 | Main body |
| 4 | Blade insert |
| 5 | Plug-in connection element |
| 6 | Cutting edge |
| 7 | Rear side of the blade insert |
| 8 | Cutting wedge |
| 9 | Flank face |
| 10 | Pressure face |
| 11 | Seat |
| 12 | Seat bearing face |
| 13 | Undercut face |
| 14 | Dovetail groove |
| 15 | Blade insert bearing face |
| 16 | Form-closure face |
| 17 | Form-closure wedge |
| 18 | Hole in the main body |
| 19 | Hole in the blade insert |
| 20 | Central axis |
| 21 | Dowel pin |
| 22 | Rear side of the shearing blade |
| 23 | Direction |
| 24 | Angle |
| 25 | Middle part |
| 26 | End section |
| 27 | Form-closure face |
| 28 | Undercut face |
| 29 | T-groove |
| 30 | Rebated joint |
| 31 | Diameter |
| 32 | Additional plug-in connection element |

The invention claimed is:

1. A shearing blade for a cutting device, the shearing blade comprising:
a main body that has a seat and
a blade insert that is arranged on the seat and forms a cutting wedge,
wherein the cutting wedge forms a cutting edge via a flank face and a pressure face at an angle to the flank face, the flank face running in a first direction along a length of the blade insert,
wherein the seat has a first end section undercut face, has a second end section undercut face, and has a middle part undercut face, the middle part undercut face running in the first direction and the first and second end section undercut faces running in respectively second and third directions, which are oblique to the first direction,
wherein each of said first and second end section undercut faces and said middle part undercut face, when the blade insert is inserted, interacts respectively with first and second end section form-closure faces and a middle part form-closure face formed on the blade insert, a form closure taking effect transversely to the flank face,
wherein said middle part form-closure face is arranged in a middle part of the blade insert, wherein said first and second end section form-closure faces are arranged, respectively, on first and second end faces on first and second end sections of the blade insert,
wherein a transition between the middle part form-closure face on the rear side of the blade insert and the first and second end section 'form-closure faces of the blade insert is rounded,
wherein said middle part undercut face has a first profile running in the first direction and said first and second end section undercut faces have respective second and third profiles running in the second and third directions,
wherein said first and second end section undercut faces of the seat and said first and second end section form-closure faces of the blade insert extend to reach the pressure face and the cutting edge,
wherein a first cross section in the second direction across the first profile is identical to second and third cross sections in the first direction respectively across the second and third profiles, wherein the blade insert is fastened to the main body by at least one detachable pin-shaped plug-in connection element oriented perpendicular to the flank face, and wherein the at least one detachable pin-shaped plug-in connection element is arranged in a main body hole of the main body and in a blade insert hole of the blade insert, the main body hole being aligned with the blade insert hole.

2. The shearing blade as claimed in claim 1, wherein the middle part undercut face is formed by a half dovetail groove in the main body, wherein the blade insert has a cross section having a shaped of a parallelogram and has a bearing face running parallel to the flank face, wherein the middle part form-closure face of the blade insert together with the bearing face of the blade insert form an acute-angled form-closure wedge opposite the cutting edge, and wherein the acute-angled form-closure wedge of the blade insert engages in the half dovetail groove of the seat and engages between the first end section undercut face and the second end section undercut face of the seat.

3. The shearing blade as claimed in claim 2, wherein the acute-angled form-closure wedge has a wedge angle of between 45° and 75°.

4. The shearing blade as claimed in claim 1, wherein the blade insert hole extends up to the flank face for receiving the plug-in connection element in the blade insert.

5. The shearing blade as claimed in claim 4, wherein the blade insert hole in the blade insert has a reduced cross section or a smaller step-like reduced diameter in a region of the flank face.

6. The shearing blade as claimed in claim 1, wherein the plug-in connection element is formed by a dowel pin in the form of a hollow, longitudinally slotted pin, a spiral dowel pin, a grooved pin or a cylindrical pin.

7. The shearing blade as claimed in claim 6, wherein the dowel pin is strengthened by a further plug-in connection element inserted into a hollow interior of the dowel pin.

8. The shearing blade as claimed in claim 1, wherein the plug-in connection element has a central axis oriented at a right angle to the flank face.

9. The shearing blade as claimed in claim 1, wherein the seat on the body for a rear side of the blade insert is formed by flat surfaces.

10. The shearing blade as claimed in claim 1, wherein a central axis of the plug-in connection element has a central axis direction differing by an angle of at least 10° from an undercut face direction of the first end section undercut face.

* * * * *